(12) United States Patent
Bono et al.

(10) Patent No.: US 9,690,803 B1
(45) Date of Patent: Jun. 27, 2017

(54) AUXILIARY FILES IN A CONTAINER FILE SYSTEM

(71) Applicant: EMC Corporation, Hopkinton, MA (US)

(72) Inventors: Jean-Pierre Bono, Westborough, MA (US); Michal Marko, Fanwood, NJ (US); Walter C. Forrester, Berkeley Heights, NJ (US); Alexander Mathews, Jamesburg, NJ (US); James P. Ferrigno, Marlton, NJ (US); Yunfei Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 460 days.

(21) Appl. No.: 14/319,634

(22) Filed: Jun. 30, 2014

(51) Int. Cl.
*G06F 17/30* (2006.01)
(52) U.S. Cl.
CPC .............. *G06F 17/30182* (2013.01)
(58) Field of Classification Search
CPC .............. G06F 17/30091; G06F 3/067; G06F 17/30203; G06F 3/0644; G06F 17/30088; G06F 17/30182; G06F 3/0643; G06F 11/1435

USPC ............. 707/812, 821, 822, 831; 711/173
See application file for complete search history.

(56) References Cited

U.S. PATENT DOCUMENTS

| 7,631,155 | B1 | 12/2009 | Bono et al. |
| 8,285,758 | B1 | 10/2012 | Bono et al. |
| 9,286,007 | B1 | 3/2016 | Bono |
| 2004/0030668 | A1 | 2/2004 | Pawlowski et al. |
| 2007/0136548 | A1* | 6/2007 | Mane ............... G06F 17/30088 711/170 |
| 2010/0138605 | A1* | 6/2010 | Kazar ................ G06F 3/0611 711/114 |

* cited by examiner

*Primary Examiner* — Evan Aspinwall
(74) *Attorney, Agent, or Firm* — BainwoodHuang (57) ABSTRACT

A technique for storing support files in a data storage apparatus provides auxiliary files in a container file system. The container file system stores a container file that provides a file-based realization of a data object, such as an entire file system, LUN, or vVOL, for example, and stores one or more auxiliary files in the container file system alongside the container file. Thus, an auxiliary file that supports an application program's operations on a data object resides in the same fault domain with the container file that realizes the data object.

17 Claims, 4 Drawing Sheets

AUXILIARY FILES IN A CONTAINER FILE SYSTEM

BACKGROUND

Data storage systems are arrangements of hardware and software that include storage processors coupled to arrays of non-volatile storage devices. In typical operation, storage processors service storage requests that arrive from client machines. The storage requests specify files or other data elements to be written, read, created, or deleted, for example. The storage processors run software that manages incoming storage requests and performs various data processing tasks to organize and secure the data stored on the non-volatile storage devices.

Data storage systems commonly run application programs to support their operations. For example, a data storage system may run a logging program to manage a transaction log or may run applications to support replication or other data services. Many such application programs require support files to store data used by the applications to support their activities. The data storage systems may store the support files in dedicated spaces, such as in support file systems or in other structures within the non-volatile storage devices.

SUMMARY

Certain data storage systems currently under development realize data objects in the form of container files that are parts of internal, container file systems. For example, a container file system may include a container file that realizes an entire file system, a LUN (Logical Unit Number), a vVOL (Virtual Volume), or some other object.

Data storage systems often operate application programs in connection with particular data objects. For example, a replication application may perform replication operations on a particular file system, LUN, or vVOL. A logging application may log transactions directed to a particular data object to store a record of transactions on the data object.

Unfortunately, data storage systems often store support files and the data objects to which they relate in different storage areas of the data storage system. As a consequence, a hardware or software fault that affects a data object may not affect its support file, and vice-versa, causing the support files and the data objects they support potentially to get out of sync. What is needed is a way of locating support files in a common fault domain with the data objects they support, so that events affecting one tend also to affect the other.

In contrast with previous approaches, an improved technique for storing support files in a data storage apparatus provides auxiliary files in a container file system. The container file system stores a container file that provides a file-based realization of a data object, such as an entire file system, LUN, or vVOL, for example, and stores one or more auxiliary files in the container file system alongside the container file. Thus, an auxiliary file that supports an application program's operations on a data object resides in the same fault domain with the container file that realizes the data object. The risk of an auxiliary file getting out of sync with the data object it supports is therefore reduced or eliminated.

In some examples, a data storage system may support direct mapping between offsets into a container file and block locations of a container file system. Direct mapping promotes efficiency by allowing the container file system to compute block locations directly from container file offsets, rather than having to traverse container file metadata (e.g., inodes and indirect block pointers). Direct mapping introduces challenges, however, when co-locating auxiliary files with container files, as a container file system can normally support direct mapping only when it includes a single file.

To overcome this obstacle, the techniques hereof may store auxiliary files in a region of the container file system normally dedicated to storing file system metadata. Data of the container file are stored in the usual manner, i.e., in a region of the container file system normally dedicated to storing file data. As direct-mapping logic operates only on the region of the container file system for storing file data, storing auxiliary files in the metadata region effectively conceals the auxiliary files from the direct-mapping logic and enables direct mapping to proceed on the container file as long as the container file system otherwise qualifies for direct mapping (e.g., as long as there are no snaps or the container file system has not been prepared for storing snaps).

Certain embodiments are directed to a method operable in a data storage apparatus. The method includes storing, in a container file system of the data storage apparatus, a data object realized in a form of a container file in the container file system. The container file system is composed from storage elements derived from a set of physical storage devices. In response to receiving a request from an application program, the method further includes creating an auxiliary file in the container file system. The method still further includes storing, in the auxiliary file, data for use by the application program to support the data object realized in the container file of the container file system.

Other embodiments are directed to a data storage apparatus constructed and arranged to perform the method described above. Still other embodiments are directed to a computer program product. The computer program product stores instructions, which when executed on one or more processing units of a data storage apparatus, cause the data storage apparatus to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for storing support files in a data storage apparatus provides auxiliary files in a container file system. The container file system stores a container file that provides a file-based realization of a data object, such as an entire file system, a LUN, or a vVOL, for example, and stores one or more auxiliary files in the container file system alongside the container file.

Figure 1:
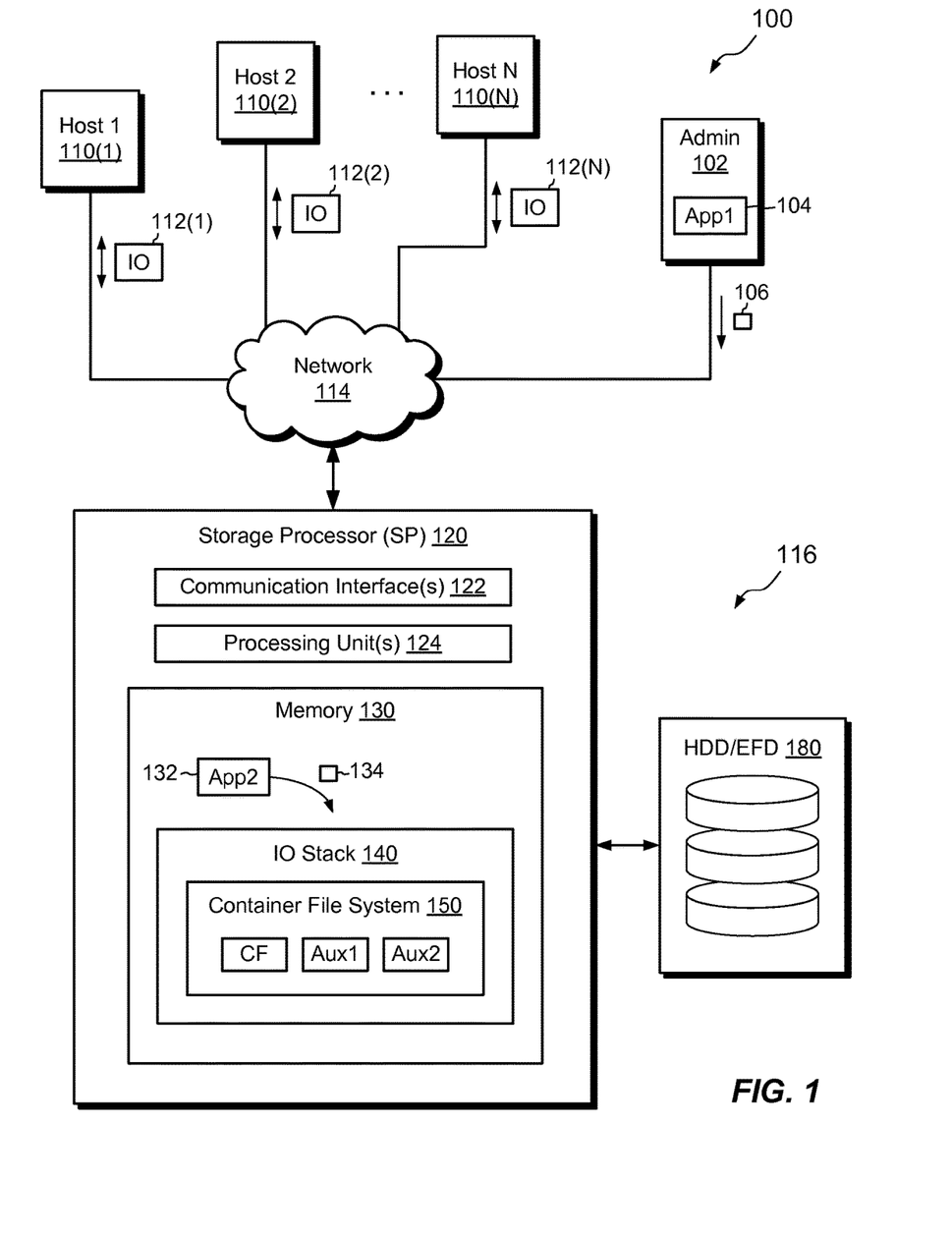
FIG. 1 is a block diagram of an example environment in which the improved technique hereof may be practiced.

FIG. 1 shows an example electronic environment 100 in which embodiments of the improved technique hereof can be practiced. Here, multiple host computing devices ("hosts") 110(1) through 110(N) access a data storage apparatus 116 over a network 114. The data storage apparatus 116 includes a storage processor ("SP") 120 and storage 180. The storage 180 is provided, for example, in the form of hard disk drives and/or electronic flash drives. The data storage apparatus 116 may include multiple SPs like the SP 120. For instance, the data storage apparatus 116 may include multiple SPs as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs. Additional information about data storage systems in which the improved technique hereof can be practiced is found in U.S. patent application Ser. No. 13/828,322, filed Mar. 14, 2013, the contents and teachings of which are incorporated by reference herein in their entirety.

The network 114 can be any type of network or combination of networks, such as a storage area network (SAN), local area network (LAN), wide area network (WAN), the Internet, and/or some other type of network, for example. In an example, the hosts 110(1-N) can connect to the SP 120 using various technologies, such as Fibre Channel (e.g., through a SAN), iSCSI, NFS, SMB 3.0, and CIFS. Any number of hosts 110(1-N) may be provided, using any of the above protocols, some subset thereof, or other protocols besides those shown. The SP 120 is configured to receive JO requests 112(1-N) and to respond to such JO requests 112(1-N) by reading and/or writing the storage 180. An administrative machine 102 may access the SP 120 over the network 114. The administrative machine 102 may operate an application program 104 and send requests 106 to SP 120. The requests 106 may include requests to create, delete, and/or modify an auxiliary file (e.g., "Aux1") stored in the data storage apparatus 116 and providing support for the application program 104.

The SP 120 is seen to include one or more communication interfaces 122, a set of processing units 124, and memory 130. The communication interfaces 122 include, for example, adapters, such as SCSI target adapters and network interface adapters, for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons, for example.

The memory 130 is seen to include (i.e., to realize by operation of programming code) an application program 132 (App2) and an JO stack 140. The application program 132 (App2) may generate requests 134 to create, delete, and/or modify an auxiliary file (e.g., "Aux2") stored in the data storage apparatus 116. The auxiliary file provides support for the application program 132 in connection with a particular data object. The application program 132 may alternatively be located on any of the hosts 110(1-N) or on the administrative machine 102.

The IO stack 140 provides an execution path for host IOs (e.g., 10 requests 112(1-N)). The IO stack 140 includes an internal representation of a container file system 150. It should be understood that the container file system 150 is a logical construct within the IO stack 140 and that the underlying data and metadata that support the container file system 150 typically reside in the storage 180. Although only a single container file system 150 is shown, the SP 120 may host any number of container file systems, like the container file system 150, limited only by available computing resources and storage.

The container file system 150 is seen to include a container file CF as well as the two above-described auxiliary files, Aux1 and Aux2. The container file CF provides a file-based realization of a data object, such as an entire file system, a LUN, or a vVOL, for example. The auxiliary files Aux1 and Aux2 respectively provide support for applications App1 (104) and App2 (132), which perform operations involving the data object realized by the container file CF. For example, App1 (104) may use Aux1 to assist with transaction logging services in connection with the data object realized by CF. Likewise, App2 (132) may use Aux2 to assist with replication services provided in connection with the data object realized in CF. Any number of application programs may provide any number of functions or services for the data object realized in CF and may use any number of respective auxiliary files, like the files Aux1 and Aux2. The application programs may be realized as stand-alone programs, which may be installed on the SP 120, administrative machine 102, and/or hosts 110(1-N). Alternatively, any of the application programs may be realized as part of a larger program, as a software service, as a daemon, or as some other type of executable software construct.

In example operation, the hosts 110(1-N) issue IO requests 112(1-N) to the data storage apparatus 116 directed to the data object realized in the container file CF. The SP 120 receives the IO requests 112(1-N) at the communication interfaces 122 and passes the IO requests to the IO stack 140. The IO stack 140 processes the IO requests 112(1-N), such as to effect read and/or write operations on the data object realized in the container file CF.

As the data storage apparatus 116 operates, the data storage apparatus 116 may create, update, and/or delete auxiliary files like Aux1 and Aux2 in response to requests from application programs. For example, App1 (104) may issue a request 106 to create a new auxiliary file. In response to the request 106, the container file system 150 may allocate an inode for Aux1 and lay down a file structure. App1 (104) may then read and write to the file Aux 1 via additional requests 106, e.g., to store data for use by App1 in supporting the data object realized in CF. When Aux1 has fulfilled its purpose and is no longer needed, App1 (104) may issue another request 106 to delete Aux1. App2 (132) may manage Aux2 in a similar manner, i.e., by issuing requests 134 to create, read, write, and/or delete Aux2.

As thus described, it is the application program (e.g., App1 or App2) that manages the lifecycle of its auxiliary file (e.g., Aux1 or Aux2). In contrast, it is the container file system 150 (e.g., operating in response to requests from hosts 110(1-N) and/or administrative machine 102) that manages the lifecycle of the data object realized in container file CF. Therefore, there is no necessary connection between the lifecycle of an auxiliary file and the lifecycle of the data object that the auxiliary file supports.

In an example, a set of software drivers (not shown) manage the container file system 150 and expose a set of APIs (Application Programming Interfaces) to the application programs App1 and App2. The application programs App1 and App2 make calls into the set of APIs to modify the auxiliary files and to manage their lifecycles.

Figure 2:
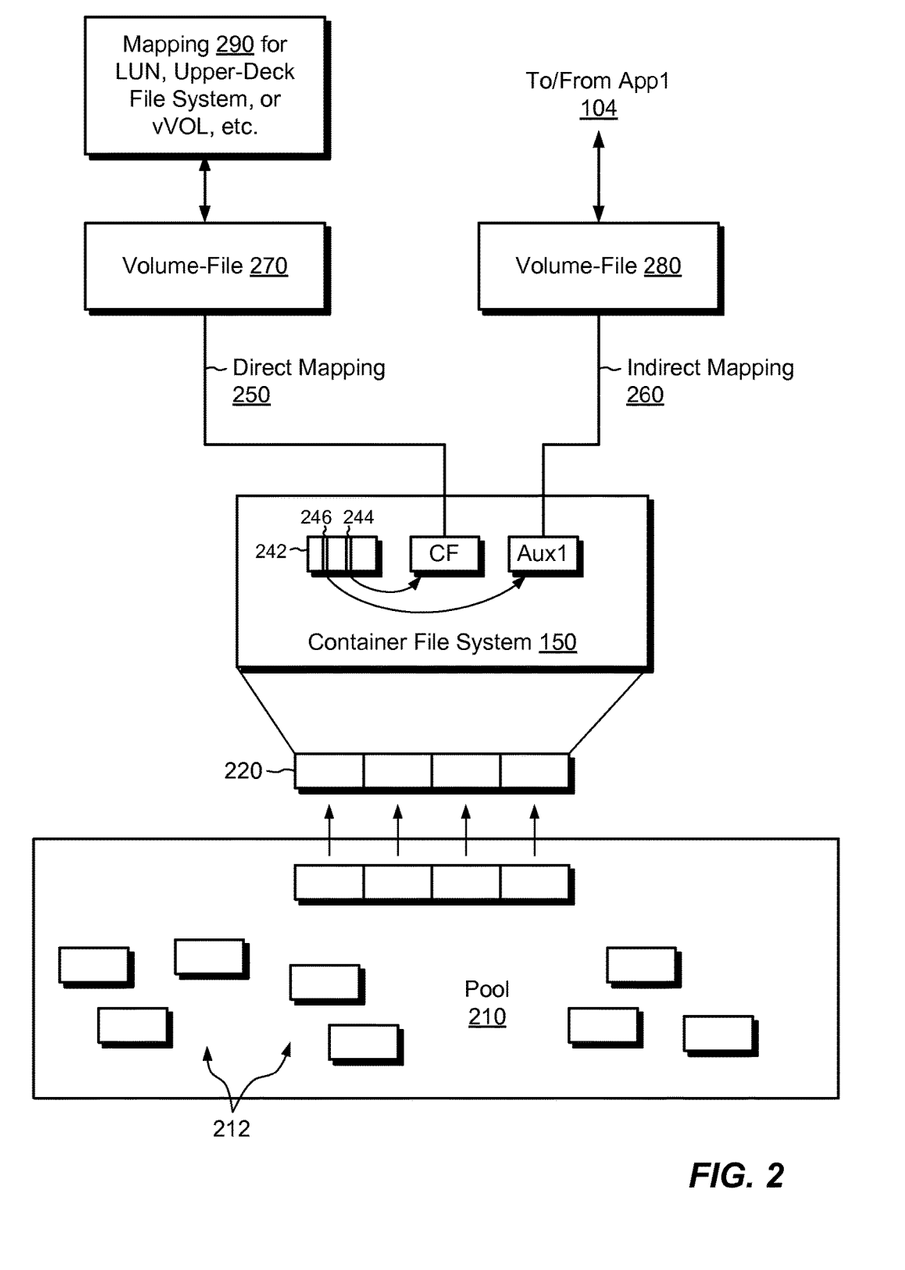
FIG. 2 is a block diagram showing a more detailed view of an IO stack as shown in FIG. 1, including an auxiliary file.

FIG. 2 shows an example implementation of the IO stack 140 of FIG. 1 in additional detail. Here, a storage pool 210 manages a repository of storage units in the form of "slices" 212. In an example, slices 212 are formed from RAID (Redundant Array of Independent Disks) groups composed of multiple disk drives or solid state drives and/or the like, which are housed in the storage 180 (FIG. 1). Each slice 212 provides 1 GB of storage space, or some other amount of space, which the IO stack 140 may provision on demand to fulfill storage requests. Here, it is seen that the IO stack 140 has provisioned four slices from the pool 210 to a sparse metavolume 220, which provides a contiguous address space of blocks for supporting the container file system 150 (see also FIG. 1).

The container file system 150 is internal to the IO stack 140 and is generally hidden from users. In the example shown, the container file system 150 includes two files, the container file CF and the auxiliary file Aux1 (see also FIG. 1). The auxiliary file Aux2 has been omitted from FIG. 2 for the sake of simplicity. In general, container files like the container file CF store file-based realizations of data objects, such as LUNs, file systems, or vVOLs, for example. Container files thus tend to be quite large. In some examples, the container file system 150 may also include snaps of the container file CF, with the snaps of the container file representing snaps of the data object the container file realizes. The container file system 150 may also include snaps of the auxiliary file Aux1, or of any auxiliary file stored therein.

The container file system 150 is further seen to include an inode table 242. The inode table 242 has a first inode 244 for CF and a second inode 246 for Aux1. The inodes 244 and 246 each have a unique inode number in the container file system 150 and each include metadata describing the files to which they refer. Each inode may also include block pointers that point to data blocks in the sparse metavolume 220 where the file content of the respective files is stored. Indirect block pointers may also be provided. Block pointers may be considered optional for direct-mapped objects. Thus, block pointers may be omitted when the container file CF is operated in a direct-mapped mode.

In some examples, the container file system 150 expresses its files using volume-file constructs. Here, a first volume-file 270 expresses CF and a second volume-file 280 expresses Aux1. The volume-files 270 and 280 provide volume-based interfaces (e.g., using SCSI semantics) to clients of the respective files. For example, the data of either of the files CF or Aux1 may be regarded as a set of blocks in the sparse metavolume 220 arranged in a particular sequence. In some cases, the sequence for the container file CF may be defined by direct mapping, e.g., where logical offsets into the container file CF map directly to corresponding block locations in the sparse metavolume 220, e.g., by computation. For Aux1 and in other cases for CF, the sequence may be defined by indirect mapping, e.g., where logical offsets into the file map to block locations in the sparse metavolume 220 via block pointers (e.g., pointers in the file's inode and indirect pointers). In the example shown, the first volume-file 270 accesses the container file CF using direct mapping 250 and the second volume-file 280 accesses the auxiliary file Aux1 using indirect mapping 260. The first volume-file 270 exposes a volume interface for CF to additional mapping layers 290 for expressing the volume-file 270 as a data object, such as a LUN, an upper-deck file system, or a vVOL, etc. The second volume-file 280 exposes a volume interface for Aux1 to an application program, in this case App1 (104).

The application program App1 can use the above-described set of APIs to read and/or write data of Aux1 via its volume-file 280, to assist App1 in performing its functions in connection with the data object stored in CF. As described above, the application program App1 can also delete Aux1 or create a new auxiliary file in the container file system 150.

As described above, direct mapping is normally available in a container file system only when the container file system is limited to a single file. Thus, if nothing further were done, placing the auxiliary file Aux1 in the same container file system 150 with the container file CF would rule out the possibility of direct mapping for accessing CF. CF would then have to be accessed using indirect mapping, such as by reading the inode 244 and following its block pointers to locate blocks in the sparse metavolume 220 holding its data. Indirect mapping is generally much less efficient than direct mapping.

Figure 3:
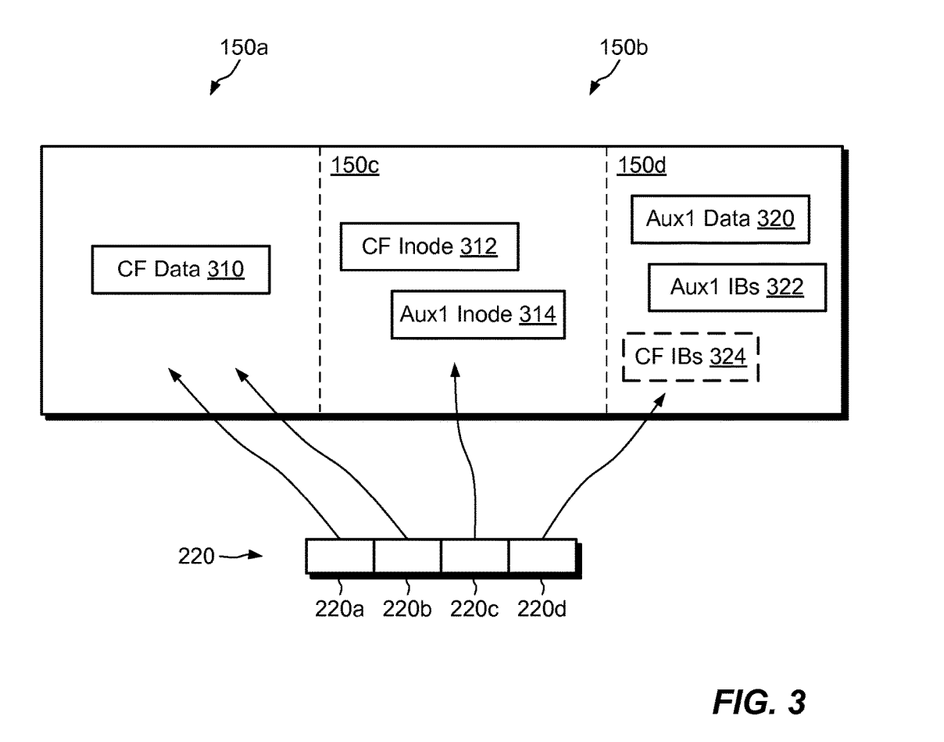
FIG. 3 is a block diagram showing an example structure of a container file system for supporting direct mapping of data objects realized in a container file in the presence of auxiliary files.

FIG. 3 shows aspects of the file system 150 in additional detail and provides a means for enabling the container file system 150 to include one or more auxiliary files without sacrificing direct mapping for CF. Here, the container file system 150 is divided into a first region 150a for storing data and a second region 150b for storing metadata. The first region 150a is provisioned with slices 220a and 220b from the sparse metavolume 220 for storing file data. Here, data 310 of the container file CF are stored entirely in the first region 150a on the slices 220a and/or 220b. The second region 150b is provisioned with slices 220c and 220d from the sparse metavolume 220 for storing metadata. The metadata stored in the second region 150b include metadata supporting the container file system 150 and metadata for the specific files stored therein. Significantly, the second region 150b also stores any auxiliary files. Thus, the second region 150b stores both the data and metadata of Aux1. Storing auxiliary files in the second region 150b keeps their data out of the first region 150a on which direct-mapping operates and thus effectively hides the auxiliary files from the file system structures involved in direct mapping. From the point of view of direct mapping logic, the container file system 150 includes only a single file and thus qualifies for direct mapping. To the direct-mapping logic, the auxiliary files are simply metadata.

FIG. 3 further shows that the second region 150b for storing metadata may be sub-divided into sub-regions 150c and 150d. Sub-region 150c stores inodes and sub-region 150d stores indirect block pointers. Additional sub-regions may be provided but are omitted from FIG. 3 for the sake of simplicity. The sparse metavolume 220 may provision the sub-regions 150c and 150d with respective sets of slices. For instance, sparse metavolume 220 may provision sub-region 150c with slice 220c and sub-region 150d with slice 220d. File data 320 and indirect block pointers 322 of Aux1 (and of auxiliary files generally) are stored in sub-region 150d, i.e., in the space for indirect block pointers. The inode 314 of Aux1 (and those of auxiliary files generally) is stored sub-region 150c, along with the inode 312 of the container file CF.

With the arrangement of FIG. 3, the container file system 150 can support direct mapping to the container file CF if the container file system 150 otherwise qualifies for direct mapping. Qualifying for direct mapping means that the container file system 150 includes only a single container file CF hosting a data object, includes no snaps of the container file CF (or of any other container file hosting a data object). Qualifying for direct mapping also means that the container file system 150 has not been prepared for snaps, e.g., has not been configured with metadata structures to support snaps. Assuming the container file system 150 otherwise qualifies for direct mapping, the presence of auxiliary files in the metadata region 150b will not interfere with direct mapping. Rather, direct mapping can proceed as if the auxiliary files were not present at all.

Figure 4:
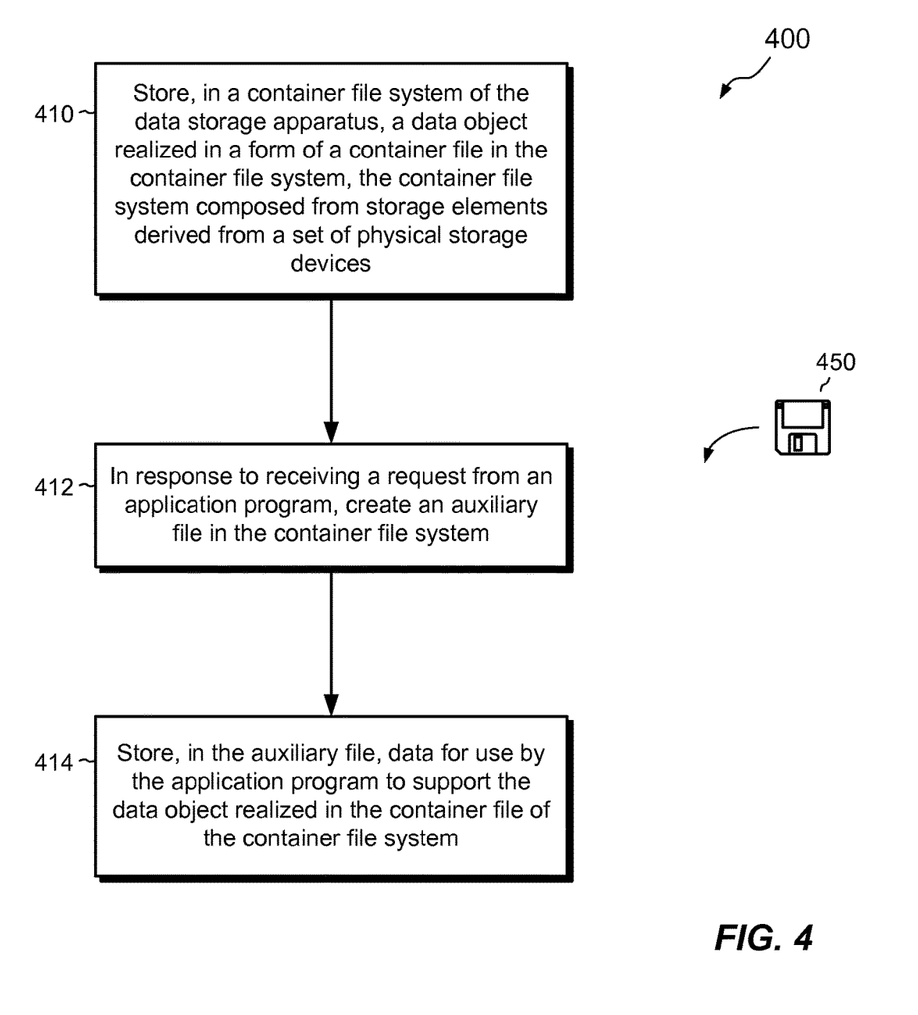
FIG. 4 is a flowchart showing an example process for storing an auxiliary file in a container file system.

FIG. 4 illustrates a process 400 that may be carried out in connection with the electronic environment 100. The process 400 is typically performed by the software constructs described in connection with FIGS. 1 and 2, which reside in the memory 130 of the SP 120 and are run by the set of processing units 124. The various acts of the process 400 may be ordered in any suitable way. Accordingly, embodiments may be constructed in which acts are performed in orders different from that illustrated, which may include performing some acts simultaneously, even though the acts are shown as sequential in the illustrated embodiments.

At 410, the SP 120 or other processing entity stores, in a container file system of the data storage apparatus, a data object realized in a form of a container file in the container file system. The container file system is composed from storage elements derived from a set of physical storage devices. For example, the SP 120 may store a file system, LUN, vVOL, or other data object in container file CF of container file system 150. The container file system 150 is composed from storage elements, such as slices 212, derived from a set of storage devices, such as those found in storage 180.

At 412, in response to receiving a request from an application program, the SP 120 or other operating entity creates an auxiliary file in the container file system. For example, the SP 120, operating in response to a request 106 from App1 (104), creates auxiliary file Aux1 in the container file system 150. Alternatively, the SP 120, operating in response to a request 134 from App2 (132), creates auxiliary file Aux2 in the container file system 150.

At 414, the SP 120 or other operating entity stores, in the auxiliary file (e.g., Aux1 or Aux2), data for use by the application program (App1 or App2) to support the data object realized in the container file CF of the container file system 150.

An improved technique has been described for storing support files in a data storage apparatus. The technique provides support files in the form of auxiliary files in a container file system. The container file system (e.g., 150) stores a container file (e.g., CF) that provides a file-based realization of a data object, such as an entire file system, LUN, or vVOL, for example, and stores one or more auxiliary files (e.g., Aux1 and/or Aux2) in the container file system 150 alongside the container file CF. Thus, an auxiliary file that supports an application program's operations on a data object resides in the same fault domain with the container file that realizes the data object. The risk of an auxiliary file getting out of sync with the data object it supports is therefore reduced or eliminated. The improved technique also provides auxiliary files in container file systems without interfering with direct-mapping logic, thus enabling data objects to be accessed with direct mapping even though the container file system includes greater than one file.

Having described certain embodiments, numerous alternative embodiments or variations can be made. For example, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 450 FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments. Those skilled in the art will therefore understand that various changes in form and detail may be made to the embodiments disclosed herein without departing from the scope of the invention.

What is claimed is:

1. A method operable in a data storage apparatus, the method comprising:
    storing, in a container file system of the data storage apparatus, a data object realized in a form of a container file in the container file system, the container file system composed from storage elements derived from a set of physical storage devices;
    in response to receiving a request from an application program, creating an auxiliary file in the container file system; and
    storing, in the auxiliary file, data for use by the application program to support the data object realized in the container file of the container file system,
    wherein the container file system includes a first region configured to store primarily container file system data and a second region configured to store primarily container file system metadata, and wherein the method further comprises:
storing data of the container file in the first region;
storing metadata of the container file in the second region;
storing both data and metadata of the auxiliary file in the second region,
wherein the container file has an inode that identifies the container file within the container file system, and wherein the method further comprises:
operating an IO stack in the data storage apparatus, the IO stack processing IO requests to the data object realized in the container file;
the IO stack expressing the container file in a form of a volume-file; and
the IO stack accessing the data of the container file through the volume-file using direct mapping, such that accessing data of the container file is performed without accessing any indirect block pointers in the inode of the container file.

2. The method of claim 1, wherein the data object realized by the container file is one of a file system, a LUN (Logical Unit Number), or a vVOL (virtual volume).

3. The method of claim 2,
wherein the auxiliary file has an inode in the container file system, the inode including indirect block pointers pointing to indirect blocks for supporting indirectly mapped access to data of the auxiliary file by the IO stack,
wherein the second region of the container file system includes a first sub-region for storing container file system inodes and a second sub-region for storing container file system indirect blocks, and
wherein storing both data and metadata of the auxiliary file in the second region includes:
storing the inode of the auxiliary file in the first sub-region for storing container file system inodes;
storing indirect blocks of the auxiliary file in the second sub-region for storing container file system indirect blocks;
storing data of the auxiliary file in the second sub-region for storing container file system indirect blocks.

4. The method of claim 3, further comprising:
in response to receiving a request from a second application program, creating a second auxiliary file in the container file system; and
storing, in the second auxiliary file, data for use by the second application program to support the data object realized in the container file of the container file system.

5. The method of claim 1, wherein the application program operates outside the IO stack and communicates with the container file system to create the auxiliary file in the container file system.

6. The method of claim 5, further comprising, in response to receiving another request the application program, deleting the auxiliary file from the container file system.

7. A data storage apparatus including a set of processing units and memory coupled to the set of processing units, the memory storing executable instructions, which when executed by the set of processing units cause the set of processing units to perform a method, the method comprising:
storing, in a container file system of the data storage apparatus, a data object realized in a form of a container file in the container file system, the container file system composed from storage elements derived from a set of physical storage devices;
in response to receiving a request from an application program, creating an auxiliary file in the container file system; and
storing, in the auxiliary file, data for use by the application program to support the data object realized in the container file of the container file system,
wherein the container file system includes a first region configured to store primarily container file system data and a second region configured to store primarily container file system metadata, and wherein the method further comprises:
storing data of the container file in the first region;
storing metadata of the container file in the second region;
storing both data and metadata of the auxiliary file in the second region, and
wherein the container file has an inode that identifies the container file within the container file system, and wherein the method further comprises:
operating an IO stack in the data storage apparatus, the IO stack processing IO requests to the data object realized in the container file;
the IO stack expressing the container file in a form of a volume-file; and
the IO stack accessing the data of the container file through the volume-file using direct mapping, such that accessing data of the container file is performed without accessing any indirect block pointers in the inode of the container file.

8. The data storage apparatus of claim 7,
wherein the auxiliary file has an inode in the container file system, the inode including indirect block pointers pointing to indirect blocks for supporting indirectly mapped access to data of the auxiliary file by the 10 stack,
wherein the second region of the container file system includes a first sub-region for storing container file system inodes and a second sub-region for storing container file system indirect blocks, and
wherein storing both data and metadata of the auxiliary file in the second region includes:
storing the inode of the auxiliary file in the first sub-region for storing container file system inodes;
storing indirect blocks of the auxiliary file in the second sub-region for storing container file system indirect blocks;
storing data of the auxiliary file in the second sub-region for storing container file system indirect blocks.

9. A non-transitory computer readable medium including instructions which, when executed by a set of processing units of a data storage apparatus, cause the set of processing units to perform a method, comprising:
storing, in a container file system of the data storage apparatus, a data object realized in a form of a container file in the container file system, the container file system composed from storage elements derived from a set of physical storage devices;
in response to receiving a request from an application program, creating an auxiliary file in the container file system; and
storing, in the auxiliary file, data for use by the application program to support the data object realized in the container file of the container file system, wherein the container file has an inode that identifies the container file within the container file system, and wherein the method further comprises:

operating an IO stack in the data storage apparatus, the IO stack processing IO requests to the data object realized in the container file;

the IO stack expressing the container file in a form of a volume-file; and the IO stack accessing the data of the container file through the volume-file using direct mapping, such that accessing data of the container file is performed without accessing any indirect block pointers in the inode of the container file.

10. The non-transitory, computer-readable medium of claim 9, wherein the container file system includes a first region configured to store primarily container file system data and a second region configured to store primarily container file system metadata, and wherein the method further comprises:

storing data of the container file in the first region;

storing metadata of the container file in the second region;

storing both data and metadata of the auxiliary file in the second region.

11. The non-transitory, computer-readable medium of claim 9, wherein the data object realized by the container file is one of a file system, a LUN (Logical Unit Number), or a vVOL (virtual volume).

12. The non-transitory, computer-readable medium of claim 11, wherein the auxiliary file has an inode in the container file system, the inode including indirect block pointers pointing to indirect blocks for supporting indirectly mapped access to data of the auxiliary file by the 10 stack, wherein the second region of the container file system includes a first sub-region for storing container file system inodes and a second sub-region for storing container file system indirect blocks, and wherein storing both data and metadata of the auxiliary file in the second region includes:

storing the inode of the auxiliary file in the first sub-region for storing container file system inodes;

storing indirect blocks of the auxiliary file in the second sub-region for storing container file system indirect blocks;

storing data of the auxiliary file in the second sub-region for storing container file system indirect blocks.

13. The non-transitory, computer-readable medium of claim 12, further comprising:

in response to receiving a request from a second application program, creating a second auxiliary file in the container file system; and storing, in the second auxiliary file, data for use by the second application program to support the data object realized in the container file of the container file system.

14. The method of claim 9, wherein the application program operates outside the IO stack and communicates with the container file system to create the auxiliary file in the container file system.

15. The non-transitory, computer-readable medium of claim 14, further comprising, in response to receiving another request the application program, deleting the auxiliary file from the container file system.

16. A non-transitory computer readable medium including instructions which, when executed by a set of processing units of a data storage apparatus, cause the set of processing units to perform a method, comprising:

storing, in a container file system of the data storage apparatus, a data object realized in a form of a container file in the container file system, the container file system composed from storage elements derived from a set of physical storage devices;

in response to receiving a request from an application program, creating an auxiliary file in a metadata region of the container file system;

storing, in the auxiliary file, data for use by the application program in managing the data object realized in the container file of the container file system; and operating an IO stack in the data storage apparatus, the IO stack processing IO requests to the data object realized in the container file, the IO stack expressing the container file in a form of a volume-file and accessing the data of the container file through the volume-file.

17. The non-transitory computer readable medium of claim 16, wherein the method further comprises the IO stack expressing the container file in the form of second volume-file and accessing the container file through the second volume-file.

* * * * *